April 20, 1965  C. W. MUSSER  3,178,963

GEAR MECHANISM

Filed June 27, 1962  2 Sheets-Sheet 1

Inventor
C. Walton Musser
By his Attorney

April 20, 1965    C. W. MUSSER    3,178,963
GEAR MECHANISM
Filed June 27, 1962    2 Sheets-Sheet 2
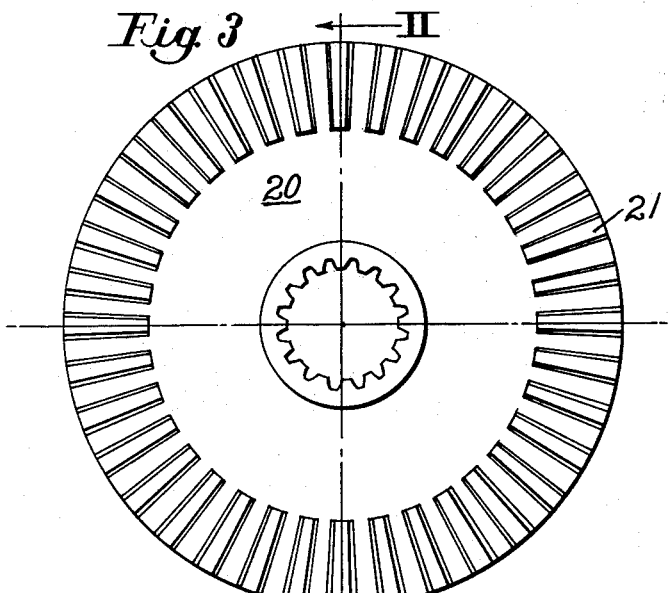
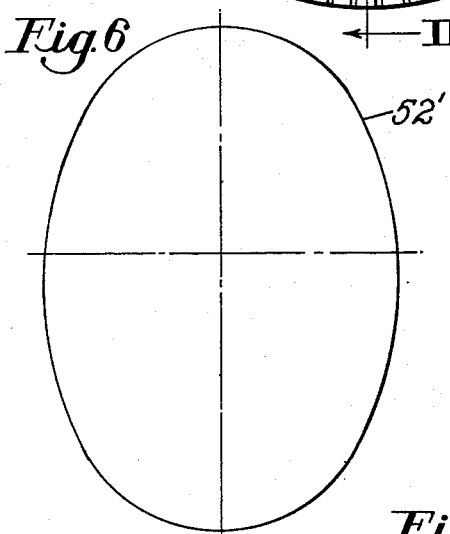
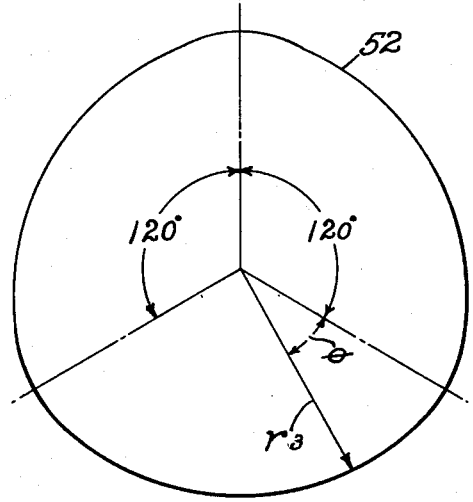
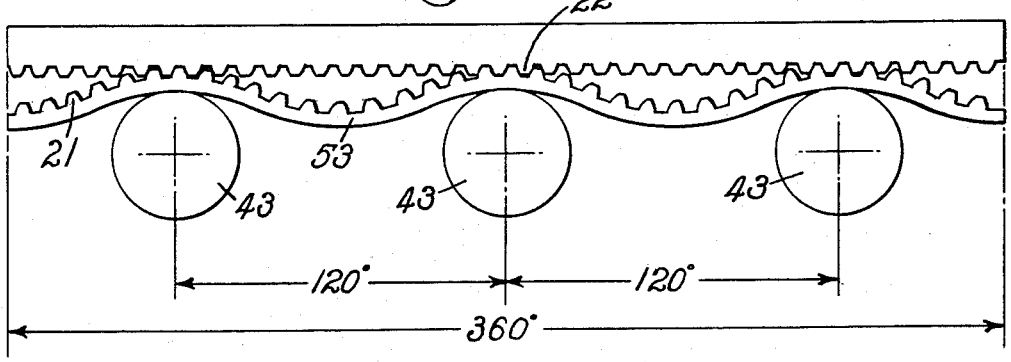

United States Patent Office 3,178,963
Patented Apr. 20, 1965

3,178,963
GEAR MECHANISM
C. Walton Musser, Palos Verdes Estates, Calif., assignor to United Shoe Machinery Corporation, Boston, Mass., a corporation of New Jersey
Filed June 27, 1962, Ser. No. 205,739
17 Claims. (Cl. 74—640)

The present invention relates to strain wave gearing or harmonic drives.

For fundamental information on the concepts of such gearing, the reader is referred to U.S. Patents Nos. 2,906,143; 2,930,250; 2,931,248; 2,983,162 and 2,959,065, issued upon applications filed in my name.

A further purpose is to obtain a ratio of the diameter of the driven element to the total height of the deflection wave over the length of the flexspline surface for any axial section of a harmonic drive which will be constant and precise, so that axial shifting of the flexspline can occur to compensate for wear without change in the ratio.

A further purpose is to minimize lateral sliding motion of the teeth in a harmonic drive after they have assumed their relative operating positions, yet permit relative axial movement and angular accommodation along the flexspline teeth as they are urged radially against a rigid spline.

A further purpose is to employ a conical spline having teeth distributed around the curved cone surface, said teeth preferably being of bevel gear configuration, with a cooperating conoidal flexspline having teeth distributed around a curved cone surface, with a common apex with respect to the apex of the cone of the conical spline, the teeth on the conoidal flexspline being preferably of bevel gear configuration, and both sets of teeth having the same diametral pitch, to deflect the teeth on the conoidal flexspline into mesh and engagement with the teeth on the conical spline at a plurality of spaced points with intermediate points at which the teeth are out of contact and out of mesh, and to relatively propagate a wave of deflection around the conoidal flexspline by relative rotation of one of the conical spline, the conoidal flexspline and a wave generator which deflects the conoidal flexspline with respect to the others.

A further purpose is to locate the conoidal flexspline on the inside of the conical spline and to locate the wave generator inside the conoidal flexspline, thus attaining greater compactness in a gear motor.

A further purpose is to employ a conoidal flexspline composed of an elastomer, whereby its splines may, if need be, better adapt to interengagement with rigid splines throughout their lengths.

A further purpose is to employ a conoidal flexspline which when relaxed takes the form of a cone.

A further purpose is to use, as a wave generator, follower cam rollers which revolve about the common axis of the conical spline and the conoidal flexspline.

A further purpose is to employ as a wave generator conical rollers having a common apex with the conical spline and the conoidal flexspline.

A further purpose is to relatively adjust the conical spline and the conoidal flexspline axially.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 3 is an end view of the conoidal flexspline relaxed, taken from the position of the line III—III of FIGURE 2.

FIGURE 4 is a diagrammatic representation of the configuration taken by the pitch line of the trianguloid teeth of the conoidal flexspline when deflected into trianguloid relationship by the wave generator.

FIGURE 5 is a developed view illustrating the relationship of the conical spline, the conoidal flexspline and the wave generator roller when using the trianguloid wave generator of FIGURE 4.

FIGURE 6 is a diagrammatic view similar to FIGURE 4 of a variation showing the conoidal flexspline deflected into an elliptoidal contour.

Figure 1:
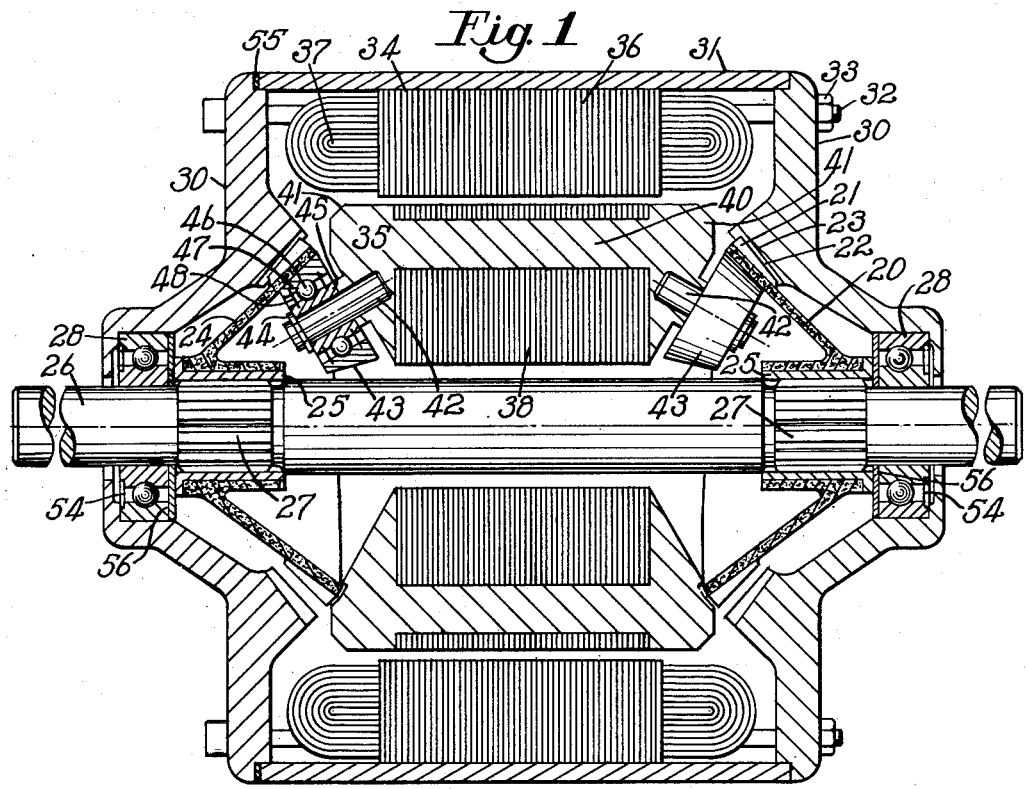
FIGURE 1 is an axial cross section of a gear motor utilizing the gearing device of the present invention at both ends, omitting the roller in the background for the sake of simplicity in illustration.

In connection with harmonic drives, where a cup shaped flexspline is employed, the ratio calculated from non-rigid body mechanics depends upon the axial position on the flexspline along the circumference of the cup. When theoretically correct teeth of the flexspline are located on the end of the cup, the deflection of the cup wall causes a slightly different non-rigid body ratio at one end of the teeth from that at the other end of the teeth. In actual practice, the customary difference-in-deflection values are so small that they do not produce undesirable effects, although it does introduce a slight amount of tooth sliding during tooth engagement.

In accordance with the present invention, a ratio is obtained which is invariable at different points along the length of the teeth, or for that matter along the circumference of the conical surface of the conical spline and the conoidal surface of the conoidal flexspline. Thus in the present invention, the ratio is precisely equal to the diameter of the driven spline divided by the total height of the deflection waves. And this is true throughout the entire cone length.

This condition can be contrasted with a cylindrical flexspline where, as previously explained, the ratio varies for various cross sections throughout the length of the cylinder. Let us assume that the teeth in such a cylindrical flexspline are on the lip of the cup. When the cup is deflected into an elliptoidal shape, it correspondingly produces an elliptoidal shape at all sections throughout the cup length up to the bottom of the cup, which remains circular. However, each section varies from every other section in respect to the relative proportion of the major axis and the minor axis of the elliptoid. For example, the elliptoid at the end of the cup has a greater difference between the major and minor axes than does the elliptoid taken near the center of the side wall of the cup. Thus all sections of the generally cylindrical side wall of the cup are elliptoidal varying from an elliptoid of maximum amplitude which is at the lip end to the bottom of the cup, which is circular. Accordingly, the ratio formula which requires dividing the diameter of the driven element by the height of the travelling wave will produce a different ratio for each cross section of the cup. For this condition the diameter of the cup is a constant but the height of the deflection wave is a variable dependent on axial positions (of working interengagement at which deflection is measured) along the cup wall.

Where, however, as in the present invention, the teeth are on the curved surface of the cone and one end of the cone is deflected into an elliptoidal or trianguloidal shape, all other sections of the curved surface of the cone parallel to the base and at right angles to the axis will have the identical configuration except for a mere change in size. The ratio between the major and the minor axis at any one of these sections will be constant and accordingly the ratio of the diameter of the driven element divided by the height of the travelling wave will be constant. For this condition the diameter of the pitch line varies in identically the same proportion as the height of the deflection wave—hence, the ratio remains constant. Thus it will be evident that for a conical configuration, the size of the elliptoid changes in various sections but the relationship of the major to the minor axis is always constant. On the other hand, in a cylindrical flexspline the size remains a constant but the relationship of the major to the minor axis is a variable.

Similar conclusions will be reached when the cone is deflected into a trianguloid or into any other suitable configuration. Since the amount of deflection and the pitch diameter of the section decreases as the apex is approached, the formula for ratio is theoretically the same at all places along the cone. Therefore elongated teeth can be employed on the cone surface without causing tooth sliding, and teeth can be used at different positions along the cone surface as desired. Axial shifting of one set of teeth with respect to another can be employed.

The features noted below, therefore, follow:

(1) In a conoidal flexspline gearing device, for any axial cross section each elliptoid or trianguloid configuration is of the same shape but of different size. The ratio between the major and minor axes is a constant throughout the length.

(2) The amount of deflection of the flexspline decreases as the apex is approached.

(3) In the cylindrical flexspline, deflection of one end to form an elliptoid or three lobed construction produces a lateral displacement of the end or bottom of the cup. This effect has been referred to as scalloping. In a conical flexspline on the other hand there is no scalloping effect present at the apex. The side wall of the flexspline can be deflected into an elliptoid or a trianguloid or other desired shape without scalloping at the apex. In fact, the open end of the conical side wall can actually be flattened without producing scalloping at the apex.

(4) Where the flexspline is conoidal and is deflected into an elliptoid or trianguloid or other suitable cross section, it can run around or within another conoidal gear tooth element where the two cones have the same apex and the teeth have a common axis, and all sections along the two cones at right angles to the axis will have the same ratio. At all of these positions the ratio will be constant because the diameter of the driven element and the height of the travelling wave are both changing proportionately.

Since of course the apex of a cone is a point without dimension, it is not practical to employ a full cone for the flexspline, but instead a truncated cone is used to give the advantages above described.

The gearing device of the invention has been incorporated into a gear motor as a convenient illustration, although it will be evident that it can be employed in a wide variety of other forms.

Referring now particularly to FIGURE 1, a conoidal flexspline 20 has near the base of the truncated conical configuration on the outside of the curved cone surface a set of conical flexspline teeth 21. These teeth 21 interengage with interior conical teeth 22 on a conical relatively rigid spline 23 which in the particular embodiment shown is outside the flexspline. It will be understood that for the purpose of the present invention the flexspline can be either on the inside or on the outside, as desired.

The conical teeth 22 on the conical spline 23 have a common apex with the conical teeth 21 on the conical flexspline 20.

Normally the conical spline 23 and its teeth 22 will be made of metal such as zinc or aluminum die casting or steel of the character usually used for gearing, and while the conoidal flexspline 20 may also be made of metal, it will preferably be produced from an elastomer such as neoprene or nylon whose structural strength will be adequate to carry the desired amount of load, or can be built up by reenforcing fibers or fabrics 24 within the flexspline and incorporated in a manner similar to the way in which strengthening fibers of glass, metal or textile materials are used in fan belts and in which fibers of glass are used in plastic molding.

While of course the flexspline 20 can be molded directly on an output shaft 26, it will preferably be molded on a spline sleeve 25 and the spline sleeve 25 will be slipped over and interengaged with splines 27 on the output shaft 26.

The output shaft is mounted on two output bearings 28, which are shown as being ball bearings, but may suitably be roller bearings or other bearings as desired. The bearings 28 are mounted within end bells or covers 30 of the motor and are sealed against the entry of dirt by seals 54.

The end bells 30 are fastened to the motor housing 31 in a conventional manner, suitably using through bolts 32 and nuts 33. The motor consists of a motor field or stator 34 and a motor armature or rotor 35. As well known in the art of electric motors such as squirrel cage induction motors, the stator is composed of magnetic laminations 36 and windings 37. The armature 35 is composed of magnetic laminations 38 and these are all tightly bound together by armature conductors 40 integral with and cast in place with the conductor end 41. The stator and armature construction are intended to be conventional and similar to any standard squirrel cage single or multiphase induction motor. Mounted within the conductor ends 41 of the rotor are bearing studs 42. These can be introduced in any suitable manner, as by incorporating them in the original casting of the rotor, or inserting them into openings as mechanical forced fits.

In the preferred embodiment, three of the studs 42 are positioned at each end of the squirrel cage armature and they are displaced 120° with respect to one another so that the flexspline will be deflected into a trianguloid form. As later explained, however, two such rollers can be used opposite one another to form an elliptoid, or any other suitable number of lobes can be employed on the wave generator which is being described.

Mounted on the stator studs 40 are cam follower rollers 43 which are suitably of conical form on the outer circumference. These are held in place on the studs 42 by snap rings 44, as well known. While of course the conical rollers 43 can be solid rollers if desired, turning on any suitable bearing, it is preferred to use antifriction bearing rollers as shown, which have inner races 45, rolling elements 46, outer races 47, and lubrication seals 48, as well known in the ball bearing art, to retain lubrication within the bearings. While ball bearings have been illustrated, roller bearings are suitable if desired. The conical outer surfaces of the rollers 43 have an apex in prolongation of such surfaces which coincides with the common apex of the teeth on the flexspline and the teeth on the conical spline.

The teeth on the conical spline and the teeth on the flexspline have the same diametral pitch and the teeth on the outer element, in this case the conical spline, are more numerous than the teeth on the inner element by any number of teeth which equals or is a multiple of the number of lobes on the wave generator (which is the same as the number of the wave generator rollers 43 or the number of points at which the flexspline teeth are brought into contact and mesh with the teeth on the conical spline).

It will be evident that at the top of FIGURE 1 the flexspline teeth and the conical spline teeth are in contact. This point corresponds to the major radius. At the bottom of FIGURE 1, since there are three wave generator rollers and the section is taken at 180°, the conical spline teeth and the flexspline teeth are separated from each other (out of contact and also out of mesh). Here the teeth of the flexspline are at the minor radius of the triangular configuration.

The manner in which these teeth engage and disengage and travel from one tooth space over to the next tooth space is described in my patents above referred to, and the reader is referred to them for detailed explanation.

Figure 2:
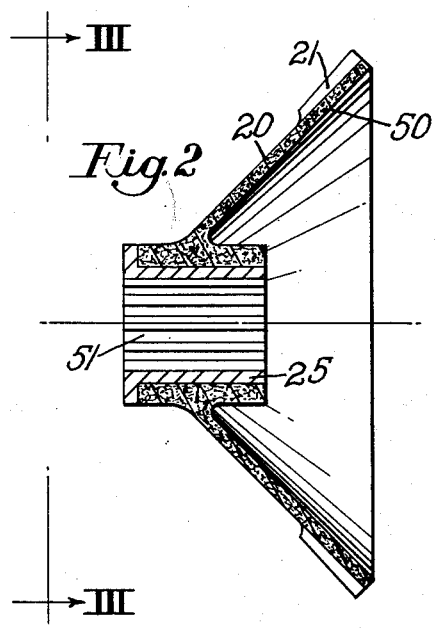
FIGURE 2 is an axial section of the conoidal flexspline, the section being taken on the line II—II of FIGURE 3 and showing the conoidal flexspline relaxed.

FIGURE 2 shows an axial section of the flexspline on an enlarged scale. Here it will be evident that the flexspline when relaxed has a conical interior surface 50. This conical interior surface is engaged in parallel or contact relationship by the follower rollers 43 when the flexspline is employed in the device of FIGURE 1. The flexspline sleeve 25 here is shown to have spline teeth 51 on the interior. With this construction the flexspline can readily be assembled on the motor.

In some cases it may be desirable to adjust the flexspline slightly axially with respect to the conical spline so as to obtain exact coincidence of the apexes of the cones. Adjustment of the conical spline with respect to the flexspline on the wave generator can be accomplished where desired by providing adjustable shims 55 between the end bells and the motor housing and changing the shims as desired to move the end bells closer together or further apart in order to increase or decrease the engagement. Shims 56 would also be adjusted to provide the desired amount of endplay in the shaft.

FIGURE 3 illustrates the flexspline 20 in relaxed position looking in the direction of the axis toward the teeth 21. It will be evident that the teeth in the form shown are similar to bevel gear teeth. While a 45° form has been shown, it will be evident, of course, that the invention is not limited to a 45° angle between the cone sides and the axis, and other suitable angles can be used.

It is very difficult to illustrate the exact relationship by which the flexspline teeth mesh at the lobes and are out of mesh and out of contact at intermediate points. It is believed that this can be understood from FIGURE 4 where it is seen that the cross sectional pitch line 52 of the flexspline teeth 21 has a major and a minor radius that varies essentially in accordance to the formula:

$$r_3 = r + d/2 \cos 3\theta$$

where:
$r_3$ = radius at any point
$r$ = undeflected radius
$d$ = height of sine wave
$\theta$ = angle from originating point The drawing shows the relationship approximately equal to the formula, although it will be understood that in a practical case there may be slight variations from the formula.

If, instead of using a trianguloid construction as provided by wave follower rollers or by any other suitable wave generator, an elliptoidal shape is used for a pitch line contour 52′, as shown in FIGURE 6, the formula would be modified to:

$$r_3 = r + d/2 \cos 2\theta$$

FIGURE 5 diagrammatically shows the interrelation of the teeth in the trianguloid form when developed. In FIGURE 5 for purposes of illustration, the teeth are shown in one cross section only and the teeth in the flexspline are naturally out of proportion to the teeth in the conical spline since the flexspline in the developed view is necessarily longer than it actually is in relation to the conical spline.

In actual operation in the particular form shown, the conical spline has the larger number of teeth as previously explained and has the larger pitch line diameter and the flexspline has a smaller diameter and at the cross section has the smaller pitch line diameter.

In the developed view, however, since the conical spline then becomes a straight line, the flexspline is represented as a wavy configuration 53, and then the flexspline becomes the longer member, and since it has the smaller number of teeth it is illustrated as if it had the larger pitch than the conical spline. Actually the teeth on the conical spline and on the flexspline have the same diametral pitch in every case.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a gearing device, a conical spline having teeth distributed around a curved cone surface, a conoidal flexspline having cooperating teeth distributed around a curved cone surface which has a common apex with the cone surface of the conical spline, the conical spline and the conoidal flexspline being one surrounding the other, the teeth on the conical spline and on the conoidal flexspline having the same diametral pitch, and the teeth on the conoidal flexspline being in contact and in mesh with the teeth on the conical spline at a plurality of circumferentially spaced points and being out of contact and out of mesh with the teeth on the conical spline at intermediate points, the number of teeth on the outer of the conical spline and the conoidal flexspline being greater than the number of teeth on the inner by an amount which is equal to or a multiple of the number of points at which the conoidal flexspline teeth are in mesh with the conical spline teeth, wave generator means for applying pressure to the side of the conoidal flexspline at the points at which its teeth are in mesh with the conical spline to deflect the conoidal flexspline into contact with the conical spline, and means for relatively moving one of the conical spline, the conoidal flexspline and the wave generator means with respect to one another about a common axis.

2. A gearing device of claim 1, in which the conical spline teeth and the conoidal flexspline teeth are bevel teeth.

3. A gearing device of claim 1, in which the conoidal flexspline is relatively inner and the conical spline is relatively outer and the means for rotating one of the elements comprises means for rotating the wave generator.

4. A gearing device of claim 1, in which the conoidal flexspline comprises an elastomer.

5. A gearing device of claim 1, in which the teeth on the conoidal flexspline are on the curved surface adjacent the base of the conoidal flexspline.

6. A gearing device of claim 1, in which the conoidal flexspline is a cone when relaxed.

7. A gearing device of claim 1, in which the wave generator means is conical and has a common axis with the conical spline and the conoidal flexspline.

8. A gearing device of claim 1, in which the wave generator means comprises conoidal rollers having a common axis with the conical spline and the conoidal flexspline and the means for rotating one of the elements comprises means for revolving the conical rollers.

9. A gearing device of claim 1, in which the wave generator means comprises follower rollers which are distributed in space and the means for rotating one of the elements comprises means for revolving the follower rollers.

10. A gearing device of claim 1, in which the conoidal flexspline is elliptoidal.

11. A gearing device of claim 1, in which the conoidal flexspline is trianguloidal.

12. A gearing device of claim 1, in which both sets of teeth are bevel teeth, in which the conoidal flexspline is located relatively on the inside and the conical spline is located relatively on the outside, and in which the wave generator means comprises conical rollers having a common apex with the apex of the conical spline and the apex of the conoidal flexspline, and the means for rotating one of the elements comprises means for revolving the conical wave generator rollers.

13. A gearing device of claim 1, in combination with means for adjusting the conoidal flexspline axially with respect to the conical spline.

14. A gearing device of claim 1, which has a ratio equal to the diameter of the driven element divided by the total height of the deflection wave, which ratio applies throughout the length of the cone of the conical spline and the conoidal flexspline.

15. A gear motor comprising a housing, an output shaft journaled therein, a stator mounted in the housing, a rotor in the housing mounted for cooperative and relative rotation with respect to the stator, a flexspline coupled to the shaft and having external teeth arranged in conoidal form, a spline having conical teeth internally formed on the housing for cooperating with the teeth formed externally of the flexspline, the shaft, rotor, stator, flexspline, and spline being coaxial, and wave generator means operable by the rotor for deflecting the flexspline teeth into engagement with the conical spline at spaced points to drive said output shaft.

16. A gear motor of claim 15, and further characterized in that the housing includes a pair of end bells each of which is formed to provide a spline having conical teeth, a pair of flexsplines having conoidal teeth are coupled to the shaft and respectively cooperate with the conical splines, and the wave generator means comprises roller elements respectively carried by opposite ends of the rotor.

17. A gearing mechanism comprising a first bevel gear rotatable on an axis, a second bevel gear rotating on the axis, the first and second bevel gears having, one externally and one internally, teeth which operatively cooperate with one another at opposite circumferential localities.

References Cited by the Examiner
UNITED STATES PATENTS
3,039,324   6/62   Waterfield _____ 74—640

DON A. WAITE, *Primary Examiner.*